(12) United States Patent
Czibur et al.

(10) Patent No.: US 10,389,103 B2
(45) Date of Patent: Aug. 20, 2019

(54) BREAKOUT BOOT ASSEMBLIES AND METHODS FOR COVERING ELECTRICAL CABLES AND CONNECTIONS

(71) Applicant: TE Connectivity Corporation, Berwyn, PA (US)

(72) Inventors: Alexander R. Czibur, Fuquay-Varina, NC (US); Mahmoud K. Seraj, Apex, NC (US); Timothy J. McLaughlin, Fuquay-Varina, NC (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 115 days.

(21) Appl. No.: 15/296,157

(22) Filed: Oct. 18, 2016

(65) Prior Publication Data

US 2018/0109100 A1 Apr. 19, 2018

(51) Int. Cl.
*H02G 15/18* (2006.01)
*H02G 15/24* (2006.01)

(52) U.S. Cl.
CPC ......... *H02G 15/1833* (2013.01); *H02G 15/24* (2013.01)

(58) Field of Classification Search
CPC .......................... H02G 15/1833; H02G 15/24
See application file for complete search history.

(56) References Cited

U.S. PATENT DOCUMENTS

| | | |
|---|---|---|
| 1,526,397 A | 2/1925 | Albin |
| 3,717,717 A | 2/1973 | Cunningham et al. |
| 3,801,730 A | 4/1974 | Nakata et al. |
| 4,110,550 A | 8/1978 | Di Pietro |

(Continued)

FOREIGN PATENT DOCUMENTS

| | | |
|---|---|---|
| EP | 0424090 | 4/1991 |
| EP | 0683557 | 11/1995 |

(Continued)

OTHER PUBLICATIONS

Notification of Transmittal of the International Search Report and the Written Opinion of the International Searching Authority, or the Declaration corresponding to International Application No. PCT/US2017/054365 (14 pages) (dated Dec. 7, 2017).

(Continued)

*Primary Examiner* — John C Hong
(74) *Attorney, Agent, or Firm* — Myers Bigel, P.A.

(57) ABSTRACT

A pre-expanded breakout boot assembly includes a breakout boot assembly including an elastomeric breakout boot and plurality of finger sealant layers of a flowable conformable medium. The breakout boot includes a tubular main section and a plurality of tubular fingers extending from an end of the main section. Each of the finger sealant layers is pre-mounted on an interior surface of a respective one of the fingers. Each of the finger holdouts is removably mounted in the finger passage of a respective one of the fingers. When the pre-expanded breakout boot assembly is positioned on the cable joint with a cable extending through each finger passage, the finger holdouts are removed from the breakout boot assembly, and each finger elastically radially contracts about a respective one of the cables, each finger sealant layer is radially interposed between each of the interior surface of the finger and the cable in the finger.

10 Claims, 12 Drawing Sheets

(56) References Cited

U.S. PATENT DOCUMENTS

| | | |
|---|---|---|
| 4,383,131 A | 5/1983 | Clabburn |
| 4,466,843 A | 8/1984 | Shimirak |
| 4,485,269 A | 11/1984 | Steinberg |
| 4,685,683 A | 8/1987 | Hall et al. |
| 4,755,241 A | 7/1988 | Steinberg |
| 4,764,232 A | 8/1988 | Hunter |
| 4,767,893 A | 8/1988 | Ball et al. |
| 4,788,245 A | 11/1988 | Anderson |
| 4,945,653 A | 8/1990 | Eager, Jr. et al. |
| 4,963,698 A | 10/1990 | Chang et al. |
| 4,994,632 A | 2/1991 | Bosisio et al. |
| 5,408,047 A | 4/1995 | Wentzel |
| 5,714,715 A | 2/1998 | Sundhararajan et al. |
| 5,735,981 A | 4/1998 | Winfield et al. |
| 5,753,861 A | 5/1998 | Hansen et al. |
| 5,821,459 A | 10/1998 | Cheenne-Astorino et al. |
| 5,844,170 A | 12/1998 | Chor et al. |
| 5,914,371 A | 6/1999 | Mueller |
| 6,100,472 A | 8/2000 | Foss |
| 6,103,975 A | 8/2000 | Krabs et al. |
| 6,111,200 A | 8/2000 | De Schrijver et al. |
| 6,245,999 B1 | 6/2001 | Costigan et al. |
| 6,472,600 B1 | 10/2002 | Osmani et al. |
| 6,520,800 B1 | 2/2003 | Michelbach et al. |
| 6,762,364 B2 | 7/2004 | Hofmann et al. |
| 7,072,188 B2 | 7/2006 | Janisch |
| 7,304,242 B1 | 12/2007 | Dower et al. |
| 7,728,227 B2 | 6/2010 | Portas et al. |
| 7,767,909 B2 | 8/2010 | Krabs et al. |
| 7,838,770 B2 | 11/2010 | Portas et al. |
| 7,858,883 B2 | 12/2010 | Seraj et al. |
| 7,863,521 B2 | 1/2011 | Campbell et al. |
| 7,901,243 B1 | 3/2011 | Yaworski |
| 8,324,502 B2 | 12/2012 | Kameda et al. |
| 8,502,076 B2 | 8/2013 | Luzzi |
| 9,178,289 B2 | 11/2015 | Seraj et al. |
| 9,202,612 B2 | 12/2015 | Hernandez et al. |
| 9,425,605 B2 | 8/2016 | Yaworski |
| 2002/0040803 A1 | 4/2002 | Buyst |
| 2003/0207620 A1 | 11/2003 | Haas et al. |
| 2003/0232166 A1 | 12/2003 | Buekers et al. |
| 2005/0111799 A1 | 5/2005 | Cooke et al. |
| 2007/0027236 A1 | 2/2007 | Bandyopadhyay et al. |
| 2008/0277139 A1 | 11/2008 | Pearce |
| 2008/0314617 A1 | 12/2008 | Pearce et al. |
| 2009/0065236 A1 | 3/2009 | Taylor et al. |
| 2010/0279542 A1 | 11/2010 | Seraj et al. |
| 2014/0262500 A1 | 9/2014 | Yaworski |

FOREIGN PATENT DOCUMENTS

| | | |
|---|---|---|
| EP | 0780949 A1 | 6/1997 |
| EP | 1206024 | 5/2002 |
| EP | 2006969 A2 | 12/2008 |
| GB | 2113925 A | 8/1983 |
| JP | H 09298827 | 11/1997 |
| JP | 3199639 | 8/2001 |
| WO | WO 1997/32381 A1 | 9/1997 |
| WO | WO 2000/01048 A1 | 1/2000 |
| WO | WO 2008/087151 A1 | 7/2008 |
| WO | 2013/153501 | 10/2013 |
| WO | WO 2013/153201 A1 | 10/2013 |
| WO | WO 2014/159228 A1 | 10/2014 |

OTHER PUBLICATIONS

Cheenne-Astorino et al. "Cold Shrinkable Technology for Medium Voltage Cable Accessory" Proceedings of 1996 Transmission and Distribution Conference and Exposition (pp. 384-390) (Sep. 15-20, 1998).

U.S. Appl. No. 12/122,048, filed May 16, 2008, Bukovnik.

U.S. Appl. No. 14/856,850, filed Sep. 17, 2015, Yaworski.

"CATJ-T-1580 Series Cold-Shrinkable Trifurcating Transition Joint for joining 3/C PILC to 3-1/C Poly/EPR Power Cables at 15kV", Raychem for TE Connectivity, Effective Date: Mar. 5, 2014, 11 pages.

"HVES-3-1590 15kV Class 3/C Live End Seals for PILC/VCLC Power Cable", Raychem, Tyco Electronics-Energy, Effective Date: Mar. 1992, 9 pages.

"HVSY-1582D 15kV Class Splice for PILC-to-PILC or PILC-to-Extruded Dielectric (Poly/EPR) Power Cable," Raychem, Tyco Electronics-Energy, PII-54866, Rev AD, PCN 528421-000, Effective Date: Mar. 14, 2000, 14 pages.

"HVS-T-1590S 15kV Class Trifurcating Splice for 3/C PILC to 3 1/C PILC Power Cables" Raychem Corporation Electrical Products, Effective Date: Jan. 25, 1999, 14 pages.

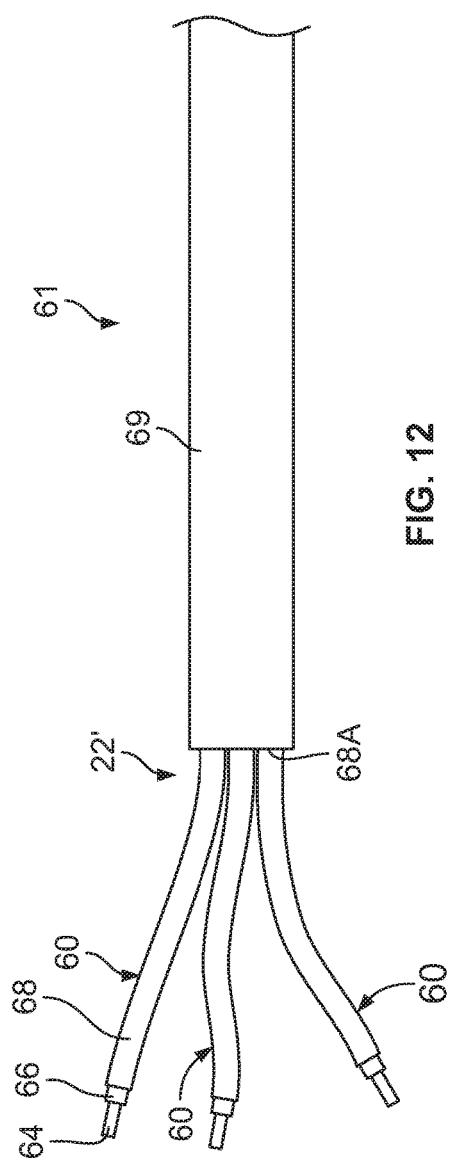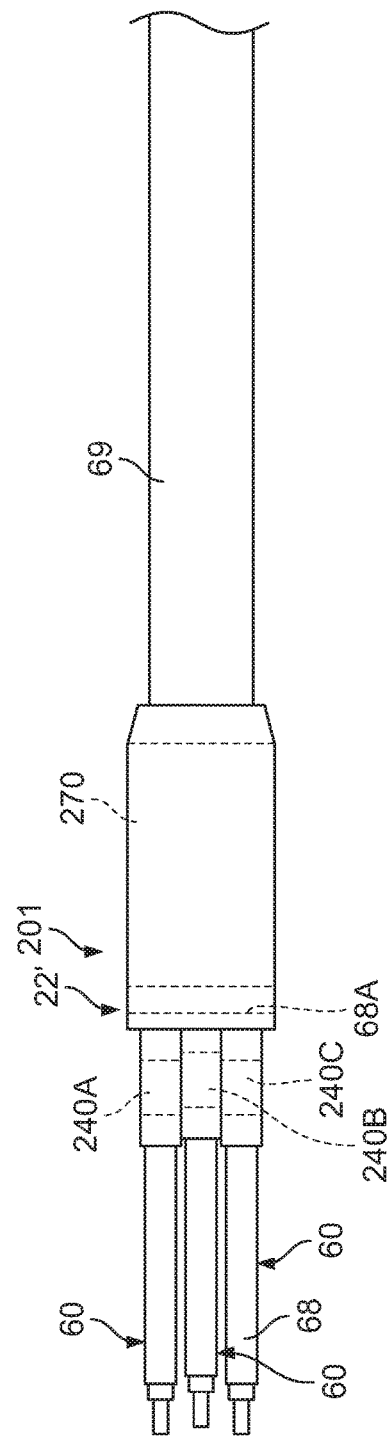

BREAKOUT BOOT ASSEMBLIES AND METHODS FOR COVERING ELECTRICAL CABLES AND CONNECTIONS

FIELD OF THE INVENTION

The present invention relates to electrical cables and connections and, more particularly, to protective covers for electrical cables and electrical connections.

BACKGROUND OF THE INVENTION

In the electrical utilities industry, maintaining cable integrity may be critical. A loss of cable integrity, for example, a short circuit in a high voltage cable, may result in a crippling power outage or, even worse, a loss of life. One everyday task that may pose a great threat to cable integrity is the formation of electrical connections.

When electrical connections are formed, a bare metal surface may be exposed such as a splice connector. These bare metal surfaces may be particularly hazardous when formed in the field where they are exposed to the environment. This environment may include rocks and other sharp objects as well as moisture when the connection is to be buried under ground and rainfall when the connection is to be suspended in the air. Thus, there is a need to protect such electrical connections from the environment.

In the case of paper insulated lead covered (PILC) cables, it may be necessary to cover a cable and/or connection to contain oil from the cable in the cable or connection.

SUMMARY OF THE INVENTION

According to embodiments of the invention, a pre-expanded breakout boot assembly for protecting a cable joint, the cable joint including a trunk and a plurality of cables extending from the trunk, includes a breakout boot assembly and plurality of removable finger holdouts. The breakout boot assembly includes a cold-shrinkable, electrically insulative, elastomeric breakout boot and plurality of finger sealant layers of a conformable medium. The breakout boot includes a tubular main section having an interior surface defining a main passage, and a plurality of tubular fingers extending from an end of the main section, each of the fingers having an interior surface defining a finger interior passage. Each of the finger sealant layers is pre-mounted on the interior surface of a respective one of the fingers. The conformable medium is a flowable material. Each of the finger holdouts is mounted in the finger passage of a respective one of the fingers such that the finger holdout maintains the finger in an elastically radially expanded state, and the finger holdout is selectively removable from the finger to permit the finger to elastically radially contract. Each finger sealant layer is positioned and configured such that, when the pre-expanded cover assembly is positioned on the cable joint with a cable extending through each finger passage, the finger holdouts are removed from the breakout boot assembly, and each finger elastically radially contracts about a respective one of the cables, each finger sealant layer will be radially interposed between each of the interior surface of the finger and the cable extending through the finger.

According to embodiments of the invention, a method of manufacturing a pre-expanded breakout boot assembly for protecting a cable joint, the cable joint including a trunk and a plurality of cables extending from the trunk, includes providing a cold-shrinkable, electrically insulative, elastomeric breakout boot and a plurality of removable finger holdouts. The breakout boot includes a tubular main section having an interior surface defining a main passage, and a plurality of tubular fingers extending from an end of the main section, each of the fingers having an interior surface defining a finger interior passage. The method further includes mounting each of a plurality of tubular finger sealant layers of a conformable medium on a respective one of the plurality of removable finger holdouts, wherein the conformable medium is a flowable material. The method further includes thereafter mounting each of the finger holdouts in the finger passage of a respective one of the fingers such that the finger holdout maintains the finger in an elastically radially expanded state, and the finger holdout is selectively removable from the finger to permit the finger to elastically radially contract. Each finger sealant layer is positioned and configured such that, when the pre-expanded cover assembly is positioned on the cable joint with a cable extending through each finger passage, the finger holdouts are removed from the breakout boot assembly, and each finger elastically radially contracts about a respective one of the cables, each finger sealant layer will be radially interposed between each of the interior surface of the finger and the cable extending through the finger.

According to embodiments of the invention, a method for protecting a cable joint, the cable joint including a trunk and a plurality of cables extending from the trunk, includes providing a pre-expanded breakout boot assembly including a breakout boot assembly and a plurality of removable finger holdouts. The a breakout boot assembly includes a cold-shrinkable, electrically insulative, elastomeric breakout boot and a plurality of tubular finger sealant layers of a conformable medium. The breakout boot includes a tubular main section having an interior surface defining a main passage, and a plurality of tubular fingers extending from an end of the main section, each of the fingers having an interior surface defining a finger interior passage. Each of the finger sealant layers is pre-mounted on the interior surface of a respective one of the fingers. The conformable medium is a flowable material. Each of the finger holdouts is mounted in the finger passage of a respective one of the fingers such that the finger holdout maintains the finger in an elastically radially expanded state, and the finger holdout is selectively removable from the finger to permit the finger to elastically radially contract. The method further includes mounting the pre-expanded breakout boot assembly on the cable joint, including: positioning the pre-expanded breakout boot assembly over the cable joint such that each of the cables extends through a respective one of the finger holdouts and the trunk portion extends through the main section; and removing the finger holdouts from the fingers to permit the fingers to elastically radially contract about the cables such that each finger sealant layer is radially interposed between each of the interior surface of its finger and the cable extending through its finger.

Further features, advantages and details of the present invention will be appreciated by those of ordinary skill in the art from a reading of the figures and the detailed description of the preferred embodiments that follow, such description being merely illustrative of the present invention.

BRIEF DESCRIPTION OF THE DRAWINGS

FIG. 12 is a fragmentary view of a cable for use with the pre-expanded breakout boot assembly unit of FIG. 10.

FIG. 13 is a fragmentary view of the pre-expanded breakout boot assembly unit of FIG. 10 installed on the cable of FIG. 12.

DETAILED DESCRIPTION OF EMBODIMENTS OF THE INVENTION

Figure 1:
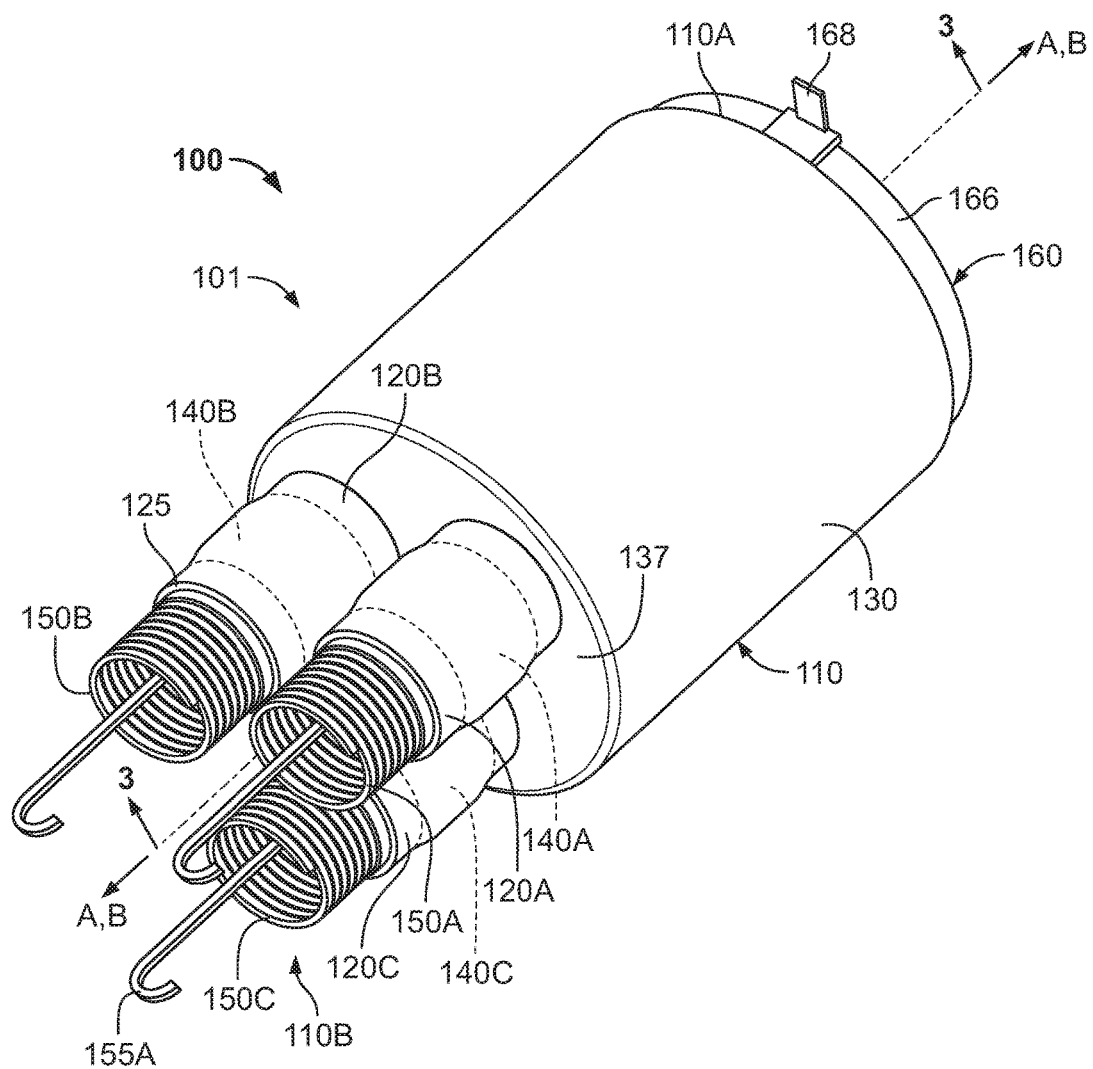
FIG. 1 is a front perspective view of a pre-expanded breakout boot assembly unit according to embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

As used herein, "cold-applied", "cold-applied cover" or "cold-applied boot" means that the cover or component can be assembled or installed about a substrate (e.g., a cable) without requiring the use of applied heat at the time of installation.

As used herein, "cold shrink", "cold shrink cover" or "cold shrink boot" means that the cover or component can be shrunk or contracted about a substrate (e.g., a cable) without requiring the use of applied heat.

As used herein, "monolithic" means an object that is a single, unitary piece formed or composed of a material without joints or seams.

With reference to FIGS. 1-9, a pre-expanded breakout boot assembly unit 100 (hereinafter, "the pre-expanded assembly") according to some embodiments of the present invention is shown therein. The pre-expanded breakout boot assembly unit 100 has a lengthwise axis A-A and includes a breakout cover or boot 110, three finger sealant layers of a flowable, conformable sealant material or medium (hereinafter, "conformable medium" or "mastic") 140A, 140B, 140C, three finger holdouts 150A, 150B, 150C, and a main holdout 160. The breakout boot 110 and the finger mastic layers 140A-C together form a breakout boot assembly 101.

Figure 8:
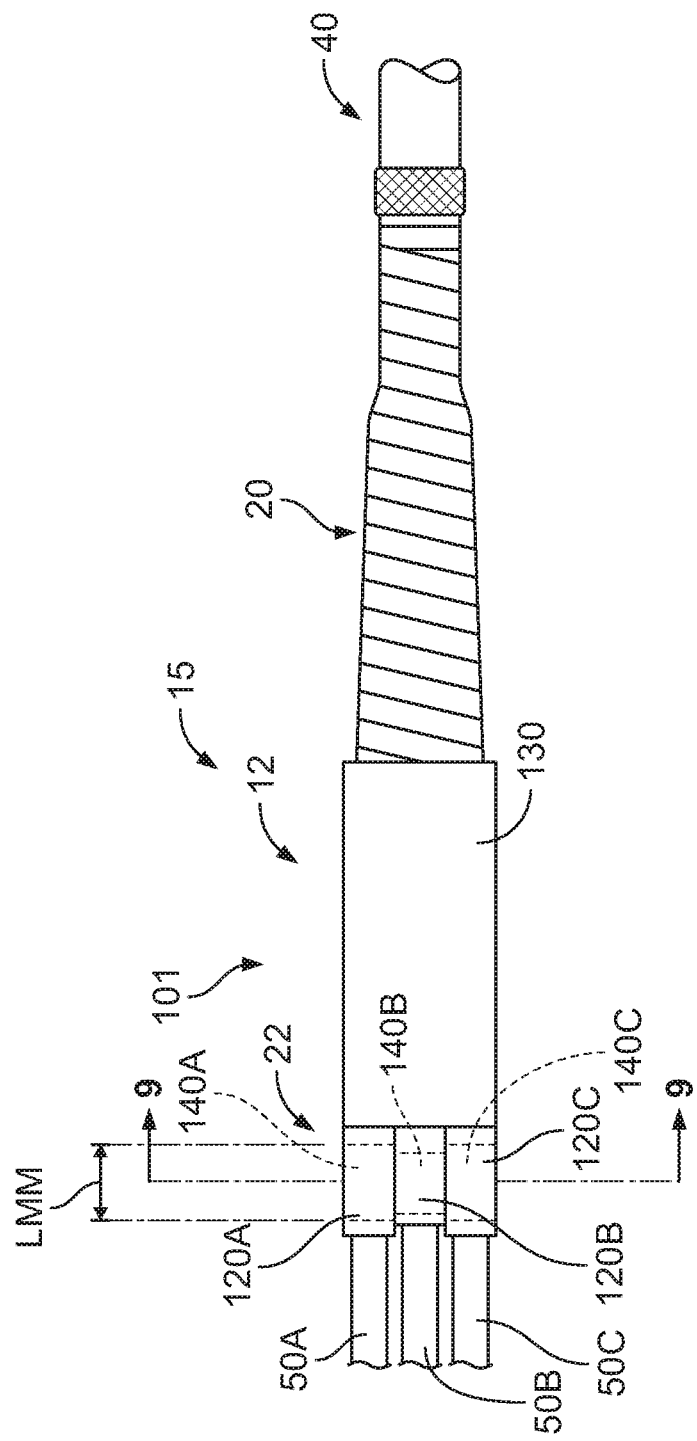
Figure 9:
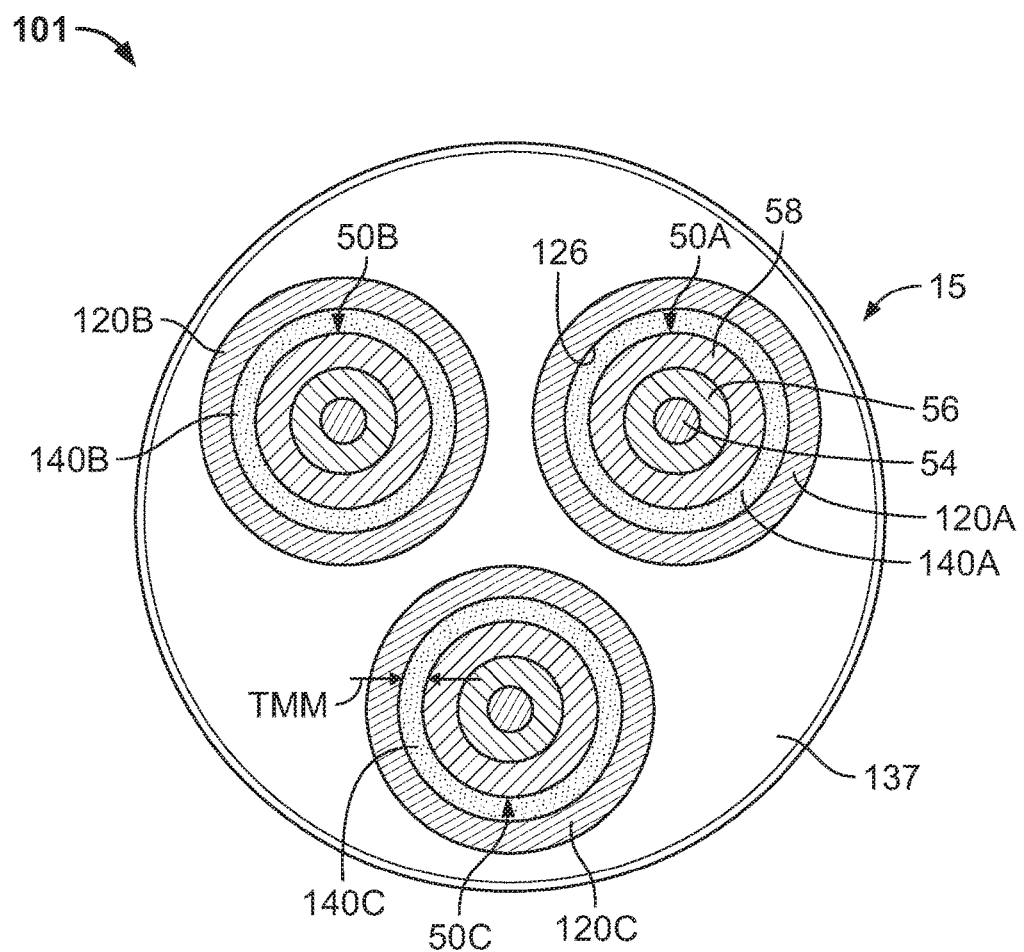
FIG. 9 is a cross-sectional view of the covered cable assembly of FIG. 8 taken along the line 9-9 of FIG. 8.
Figure 10:
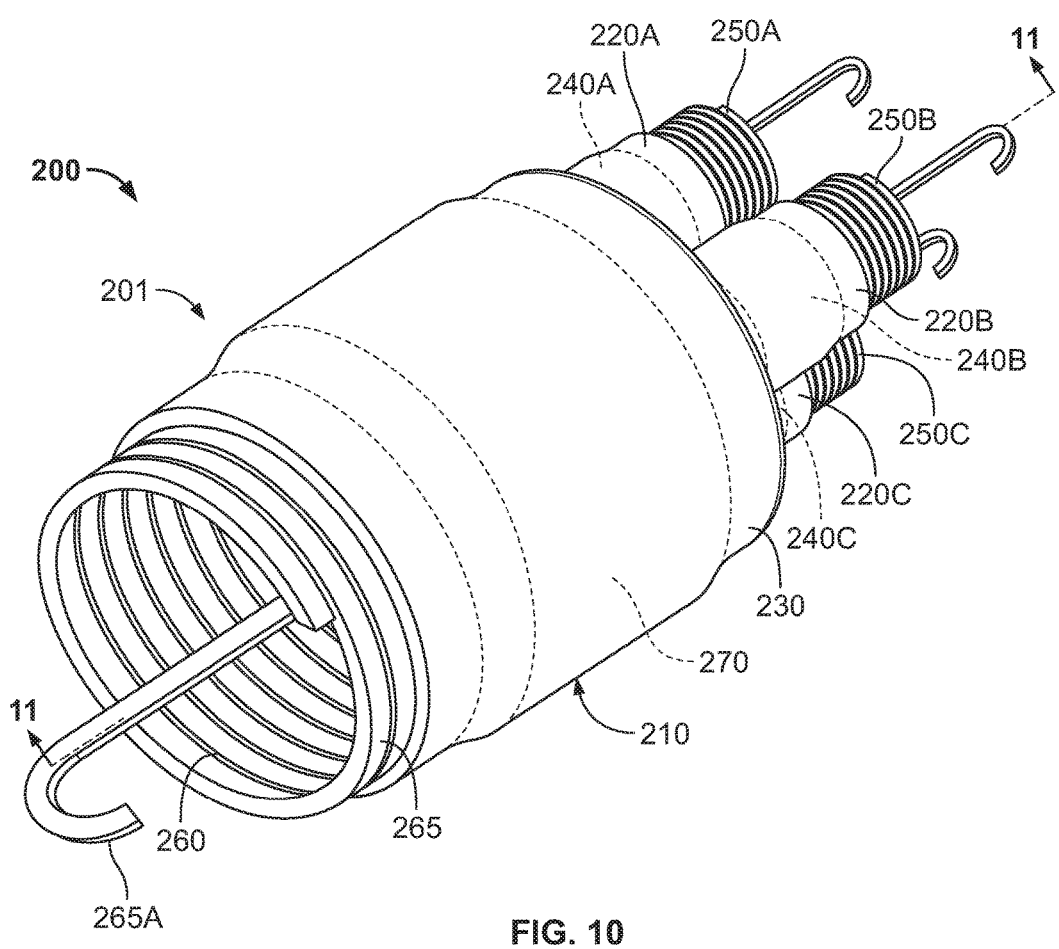
FIG. 10 is a rear perspective view of a pre-expanded breakout boot assembly unit according to further embodiments of the present invention.
Figure 11:
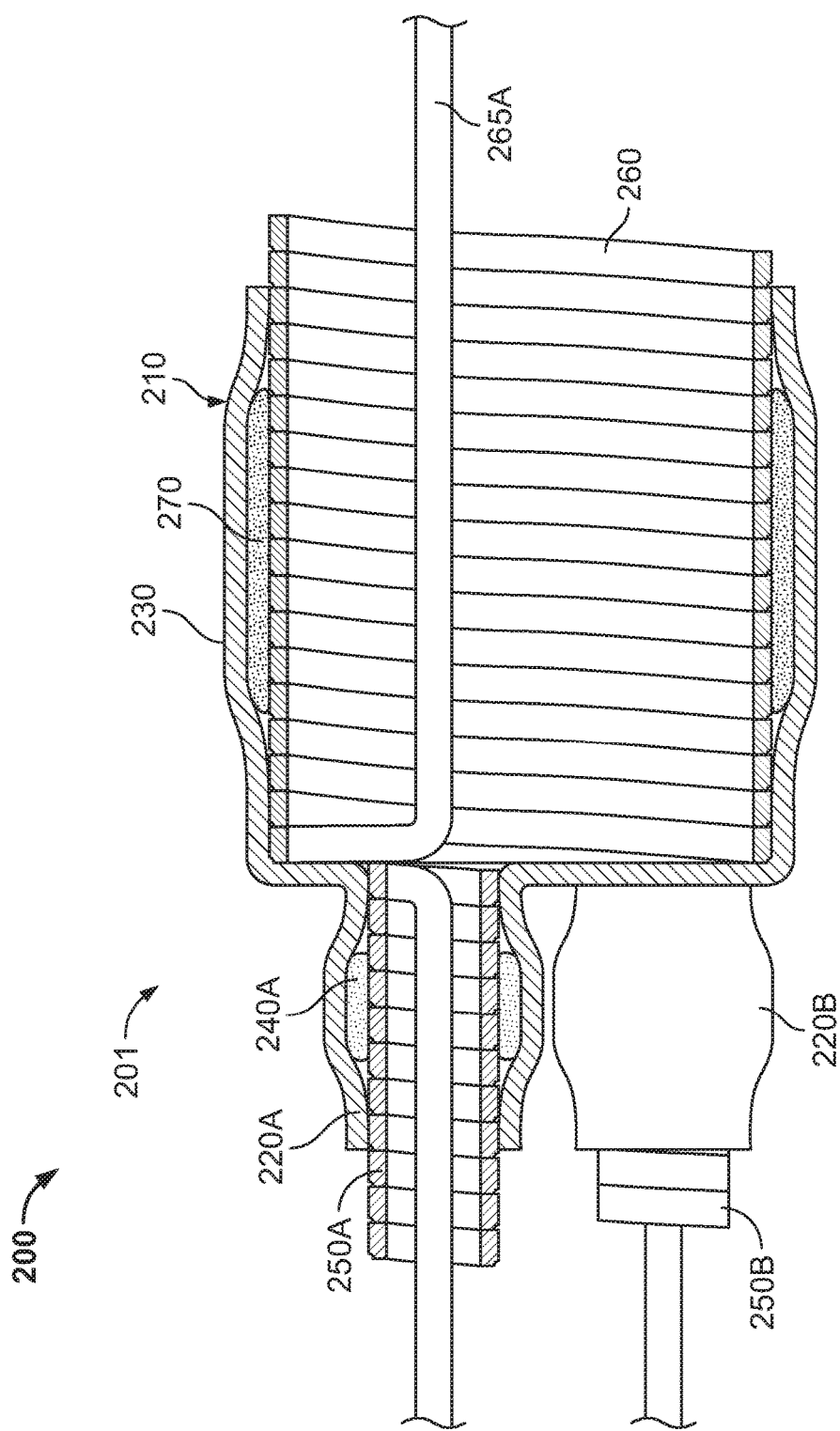
FIG. 11 is a cross-sectional view of the pre-expanded breakout boot assembly unit of FIG. 10 taken along the line 11-11 of FIG. 10.

The pre-expanded breakout boot assembly unit 100 may be used to cover and electrically insulate electrical substrates such as cables and connectors. In particular, the pre-expanded breakout boot assembly unit 100 may be used to cover an electrical cable joint or a splice between electrical cables and form a protected cable joint, for example. FIGS. 8 and 9 show an exemplary protected cable joint 15. In the protected cable joint 15, a splice connection 12 (FIG. 5) is provided between electrical power transmission cables 50A-C and 40. The breakout boot assembly 101 has been installed from the pre-expanded breakout boot assembly unit 100 over or adjacent the splice connection 12, as discussed in more detail below.

Figure 2:
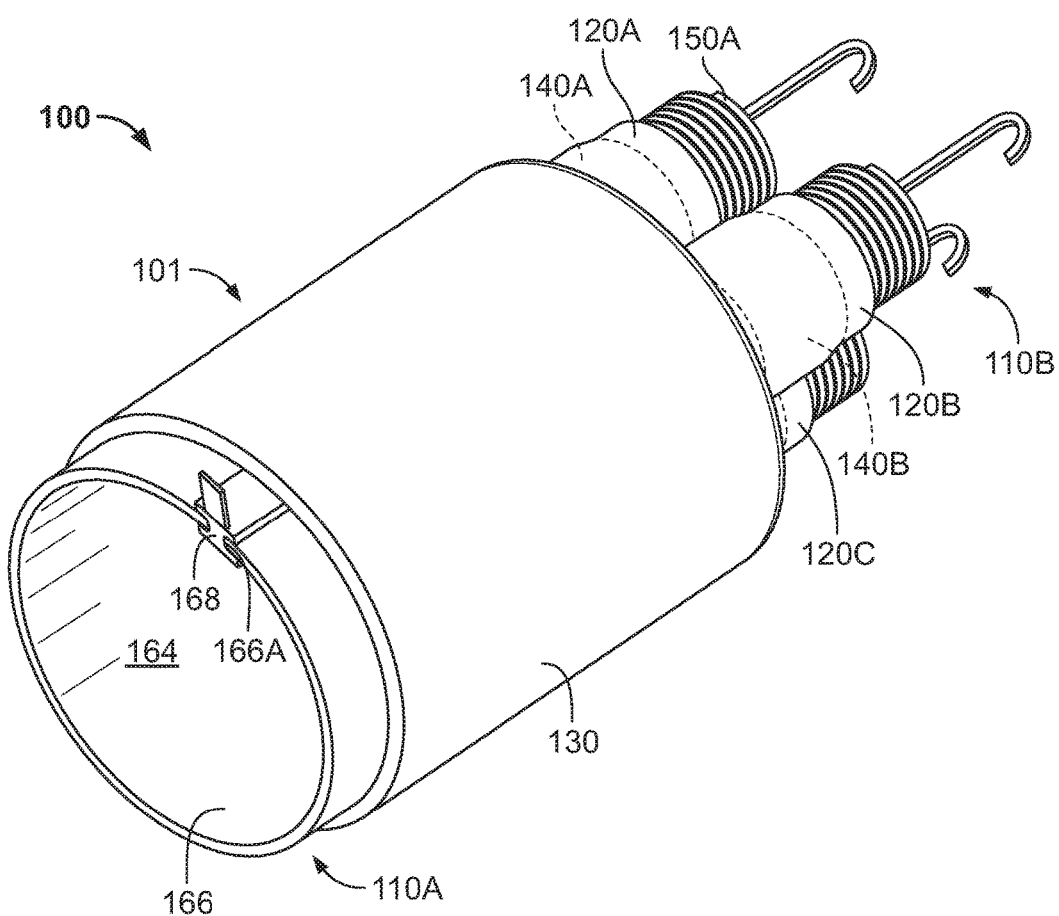
FIG. 2 is a rear perspective view of the pre-expanded breakout boot assembly unit of FIG. 1.
Figure 3:
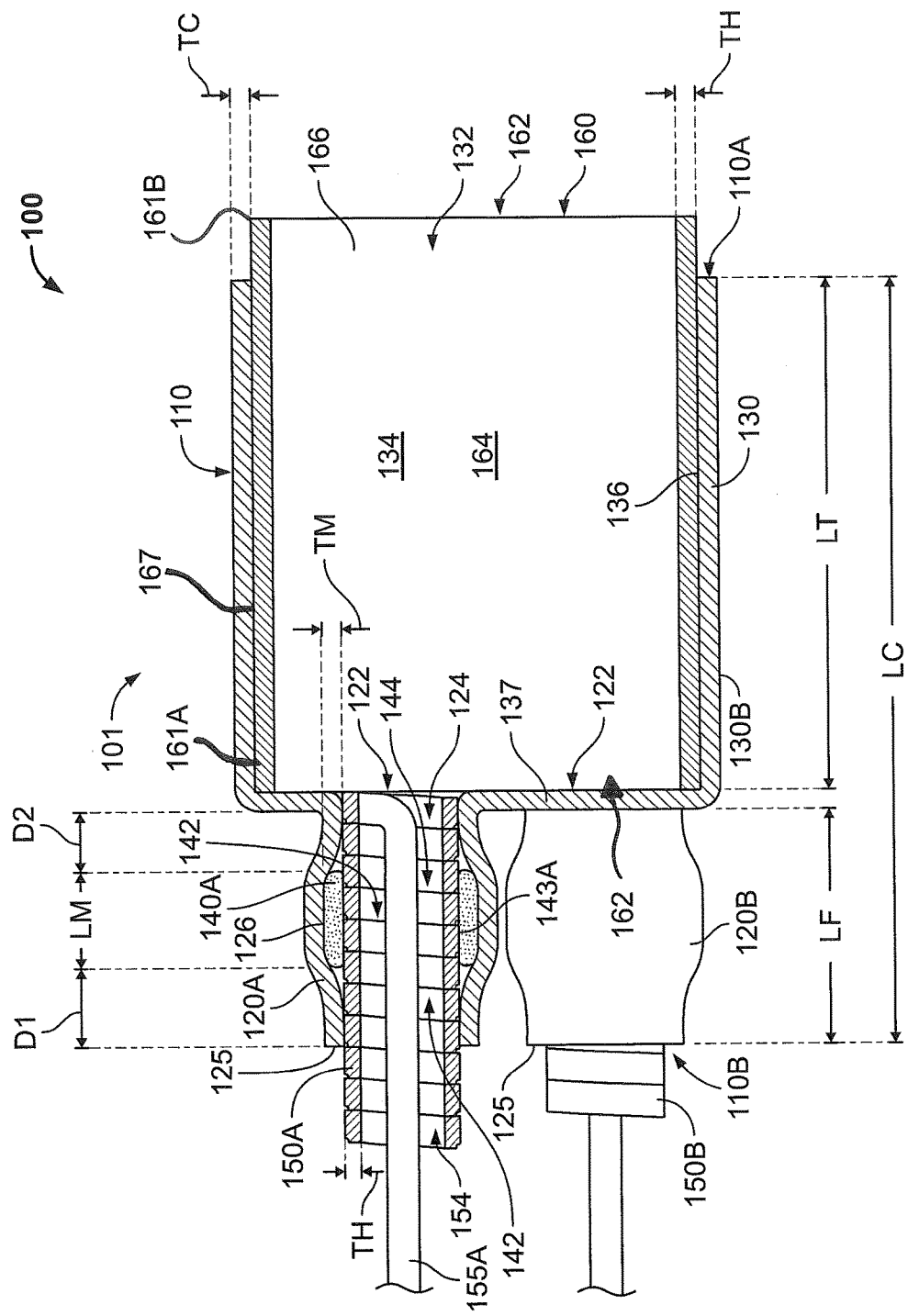
FIG. 3 is a cross-sectional view of the pre-expanded breakout boot assembly unit of FIG. 1 taken along the line 3-3 of FIG. 1.
Figure 4:
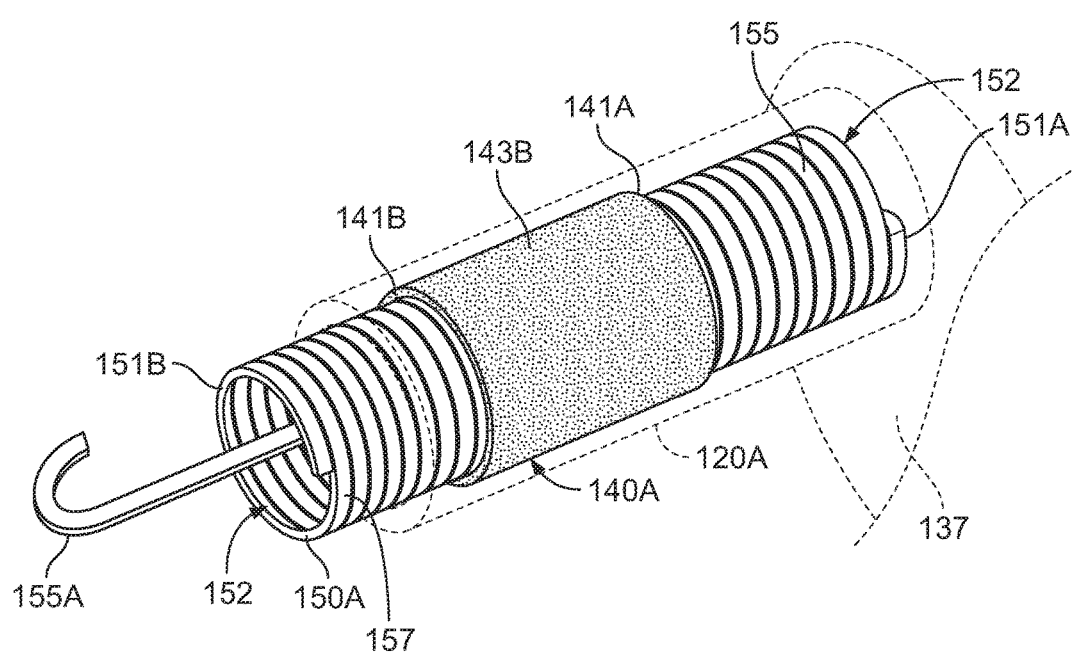
FIG. 4 is a fragmentary, perspective view of the pre-expanded breakout boot assembly unit of FIG. 1, wherein a finger of a breakout boot thereof is shown in transparency.

The breakout boot assembly 101 may be deployed and mounted on the intended substrate from an expanded configuration, state or position (as shown in FIGS. 1-3) to a retracted state or position (as shown in FIGS. 8 and 9), as discussed in more detail below. According to some embodiments, the cover assembly 101 is a cold shrink cover, meaning that it can be shrunk or retracted about the substrate without requiring the use of applied heat.

The breakout boot 110 has a lengthwise axis B-B and opposed ends 110A, 110B. The breakout boot 110 includes a tubular main section 130, an integral transition wall 137, and three integral, tubular finger sections or fingers 120A, 120B, 120C. The main section 130 extends from the end 110A to an inner end 130B at the transition wall 137. Each finger 120A-C extends from the transition wall 137 to a respective finger free end 125 at the end 110B.

The main section 130 is tubular and has an inner surface 136 defining an axially extending main through passage 134. The main through passage 134 communicates with an end opening 132 at the end 110A.

Each finger 120A-C is tubular and has an inner surface 126 defining an axially extending finger through passage 124. Each finger through passage 124 communicates with an end opening 122 at the end 110B and with the main through passage 134 at the transition wall 137.

The breakout boot 110 can be formed of any suitable material. According to some embodiments, the breakout boot 110 is formed of an electrically insulative material. According to some embodiments, the breakout boot 110 is formed of an elastically expandable material. According to some embodiments, the breakout boot 110 is formed of an elastomeric material. According to some embodiments, the breakout boot 110 is formed of ethylene propylene diene monomer (EPDM) rubber. Other suitable materials may include neoprene or other rubber. According to some embodiments, the breakout boot 110 has a Modulus at 100 percent elongation (M100) in the range of from about 0.6 to 1.1 MPa.

According to some embodiments, the breakout boot 110 is molded. In some embodiments, the breakout boot 110 is integrally molded. In some embodiments, the breakout boot 110 is monolithic.

According to some embodiments, the thickness TC (FIG. 3) of the breakout boot 110 is in the range of from about 2.7 to 3.3 mm.

According to some embodiments, the length LC (FIG. 3) of the breakout boot 110 is in the range of from about 129 to 131 mm. According to some embodiments, the length LF (FIG. 3) of each finger 120A-C is in the range of from about 88 to 92 mm. According to some embodiments, the length LT (FIG. 3) of the main section 130 is in the range of from about 105 to 135 mm.

Each of the finger sealant layers 140A, 140B, 140C is a generally cylindrical, tubular layer of a flowable, conformable material or medium ("the conformable medium"). According to some embodiments and as discussed herein, the conformable medium of the layers 140A, 140B, 140C is a conformable, flowable mastic.

Each mastic layer 140A-C has an inner surface 143A (FIG. 3) and an opposing outer surface 143B, and opposed axial terminal ends 141A, 141B. Each inner surface 143A defines an axially extending mastic through passage 144 that communicates with opposed end openings 142.

Each of the mastic layers 140A-C is adhered or bonded by its outer surface to the inner surface 126 of it associated finger 120A-C. Each mastic layer 140A-C extends continuously from axial terminal end 141A to axial terminal end 141B.

The mastic layers 140A, 140B, 140C may be any suitable type of mastic having the necessary or desired properties to function as intended. In particular, the mastic layers 140A, 140B, 140C should be sufficiently soft, at temperatures in the intended cold-applied installation and use temperature range, that they can conform to surfaces of the cables 50A-C as discussed below.

According to some embodiments, the mastic layers 140A-C are electrically insulating.

According to some embodiments, the mastic layers 140A-C have a dielectric constant of at least 100 kV/cm.

According to some embodiments, the mastic layers 140A-C have a volume resistivity of at least $1 \times 10^{13}$ Ohm-cm.

According to some embodiments, the mastic layers 140A-C have a dielectric strength of less than 5.0 Volts/mil.

According to some embodiments, the mastic layers 140A-C have a density in the range of from about 1.45 to 1.55 g/cm$^3$.

According to some embodiments, each mastic layer 140A-C has a thickness TM (FIG. 3) in the pre-expanded unit 101 in the range of from about 2 to 4 mm.

According to some embodiments, each mastic layer 140A-C has a length LM (FIG. 3) in the pre-expanded unit 100 in the range of from about 19 to 31 mm.

Each mastic layer 140A-C is axially inset from the opposed distal (free) end and proximal (base) end of its finger 120A-C. In some embodiments, the inset distance D1 (FIG. 3) from the free end 110B is in the range of from about 19 to 26 mm. In some embodiments, the inset distance D2 (FIG. 3) from the transition wall 137 is in the range of from about 25 to 39 mm.

The mastic layers 140A-C may be formed of any suitable flowable sealing mastic. According to embodiments of the present invention, the mastic layers 140A-C include a polymer that is at least partially crosslinked (semi-crosslinked). While mastic layers 140A-C include a polymer that is at least partially crosslinked, the mastic layers 140A-C are still deformable and adherent to the material of the breakout boot 110 and the cable insulation 56. However, the crosslinking in the mastic layers 140A-C prevents them from flowing from the breakout boot 110 at operating temperatures. According to some embodiments, the mastic layers 140A-C are not free flowing at least in an operating temperature range of from −20 to 135° C. Thus, in some embodiments, the polymer in the mastic layers 140A-C has a free flowing temperature that is higher than 140° C., more preferably higher than 150° C., and more preferably higher than 180° C. In some embodiments, the polymer of the mastic layers 140A-C does not flow prior to decomposition due to crosslinking. In some embodiments, mastic layers 140A-C include crosslinked butyl rubber. Other suitable mastics may include mastics including synthetic rubber or synthetic polymer mastics. According to some embodiments, the mastic 140A-C is a silicone rubber-based mastic. Suitable polymers that may be included in the mastic layers 140A-C include S1278 sold by TE Connectivity.

Each finger holdout 150A-C is a generally cylindrical, tubular member extending from an end 151A to an end 151B. Each finger holdout 150A-C defines a through passage 154. The passage 154 communicates with opposed end openings 152.

According to some embodiments, each finger holdout 150A-C includes a flexible strip 155 helically wound to form a rigid cylinder and having a pull tab or end segment 155A extending through the passage 154 as illustrated, for example.

The holdouts 150A-C can be formed of any suitable material. According to some embodiments, the holdouts 150A-C are formed of a semi-rigid polymeric material. According to some embodiments, the holdouts 150A-C are formed of polypropylene, ABS, or PVC.

Each finger holdout 150A-C has an outer surface 157. Each of the mastic layers 140A-C is adhered or bonded by its inner surface to the outer surface 157 of it associated finger holdout 150A-C.

The main holdout 160 is a generally cylindrical, tubular member extending from an end 161A to an end 161B. The main holdout 160 has an outer surface 167 and defines a through passage 164. The passage 164 communicates with opposed end openings 162.

The main holdout 160 includes a core or body 166 and an elongate rail 168. The rail 168 is seated in an axially extending slot 166A defined in the body 166. The rail 168 holds the opposed edges of the slot 166A apart and thereby maintains the rigid, tubular configuration of the holdout 160. However, the rail 168 can be axially slid out of the slot 166A to thereby permit the body to collapse radially inwardly.

According to some embodiments, each holdout 150A-C, 160 has a thickness TH (FIG. 3) in the range of from about 3 to 7 mm. The thicknesses of the holdouts 150A-C, 160 may be different from one another.

The breakout boot assembly 101 and the pre-expanded unit 100 may be formed by any suitable method and apparatus. According to some embodiments, the mastic layers 140A-C are pre-mounted on the outer surfaces 157 of the finger holdouts 150A-C, and the fingers 120A-C are thereafter expanded, placed around the finger holdouts 150A-C and the mastic layers 140A-C, and permitted to contract about the finger holdouts 150A-C and the mastic layers 140A-C. The fingers 120A-C may be expanded using a sock expander, for example.

When mounted on its finger holdout 150A-C, each finger 120A-C is maintained in an elastically radially expanded state or position. According to some embodiment, in the expanded state each finger 120A-C is expanded in the range of from about 400 to 200 percent of its relaxed diameter. As a result, the finger 120A-C of the pre-expanded unit 100 will exert a radially compressive pressure or load on the underlying mastic layer 140A-C (which is constrained on its interior side by the rigid finger holdout 150A-C). According to some embodiments, in spite of this compressive loading, the underlying mastic layer 140A-C will retain its general shape and position and will resist bleed out of oil.

The main holdout device 160 is assembled by inserting the rail 168 into the slot 166A. The holdout 160 is mounted in the inner passage 134 of the breakout boot 110 such that the main section 130 of the breakout boot 110 is in a radially expanded condition or state as compared to its relaxed state and its intended installed state. It will be appreciated that the elastically expanded main section 130 applies a persistent radially compressive load (i.e., a recovery force) on the holdout 160, and the holdout 160 resists radial collapse of the body 166 due to this load. The holdout 160 thereby serves as a supporting structure that resists radial contraction of the main section 130. The pre-expanded breakout boot assembly 100 may be stored, transported, etc. in this condition.

Methods for using the pre-expanded breakout boot assembly unit 100 will be described with reference to FIGS. 5-9, which illustrate steps for forming an exemplary protected cable joint 15. However, it will be appreciated that methods for using pre-expanded breakout boot assemblies as disclosed herein are not limited to installation on splice connections or cables of a particular type (e.g., polymer insulated cables or PILC cables).

Figure 5:
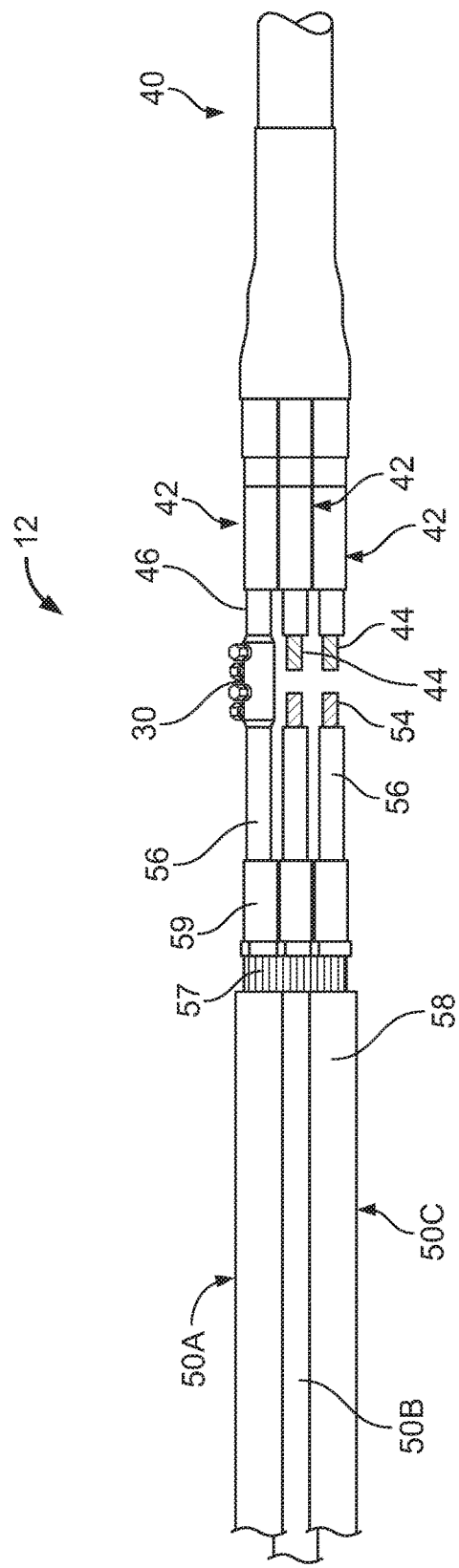
FIGS. 5-8 illustrate methods for forming a covered cable assembly according to embodiments of the invention using the pre-expanded breakout boot assembly unit of FIG. 1.

Referring to FIG. 5, a PILC cable 40 and three polymer insulated cables 50A-C are shown therein. According to some embodiments, the cables 40, 50A-C are medium-voltage (e.g., between about 5 and 35 kV) or high-voltage (e.g., between about 46 and 230 kV) power transmission cables.

The cable 40 is a paper insulated lead covered (PILC) cable including three cable cores 42. Each cable core 42 includes an electrical conductor 44, an oil-impregnated paper insulation layer 46 surrounding the conductor 44, and a metal (e.g., lead or aluminum) sheath surrounding the cable cores 42, collectively.

The polymer insulated cables 50A-C may each include an electrical conductor 54, a polymeric insulation layer 56 surrounding the conductor 54, and a polymeric jacket 58 surrounding the polymeric insulation layer 56. Each cable 50A-C may include additional layers or components including a metal shield layer 57 and a semiconductive layer 59, for example. According to some embodiments, the cables 50A-C are concentric neutral cables. According to some embodiments, the cables 50A-C are metal tape shielded or longitudinally corrugated (LC) metal shielded cables.

The conductors 54 may be formed of any suitable electrically conductive materials such as copper (solid or stranded). The polymeric insulation layers 56 may be formed of any suitable electrically insulative material such as crosslinked polyethylene (XLPE) or EPR. The semiconductor layers 59 may be formed of any suitable semiconductor material such as carbon black with silicone. The shield layers 57 may be formed of any suitable material such as copper. The jacket 58 may be formed of any suitable material such as EPDM rubber or PVC.

Each conductor 44 is electrically and mechanically connected to the conductor 54 of a corresponding cable 50A-C using a connector 30 to form an electrical splice between the connected cables. In FIG. 5, only one connector is shown; however, in this step each of the three sets of conductors 44, 54 are connected.

Figure 6:
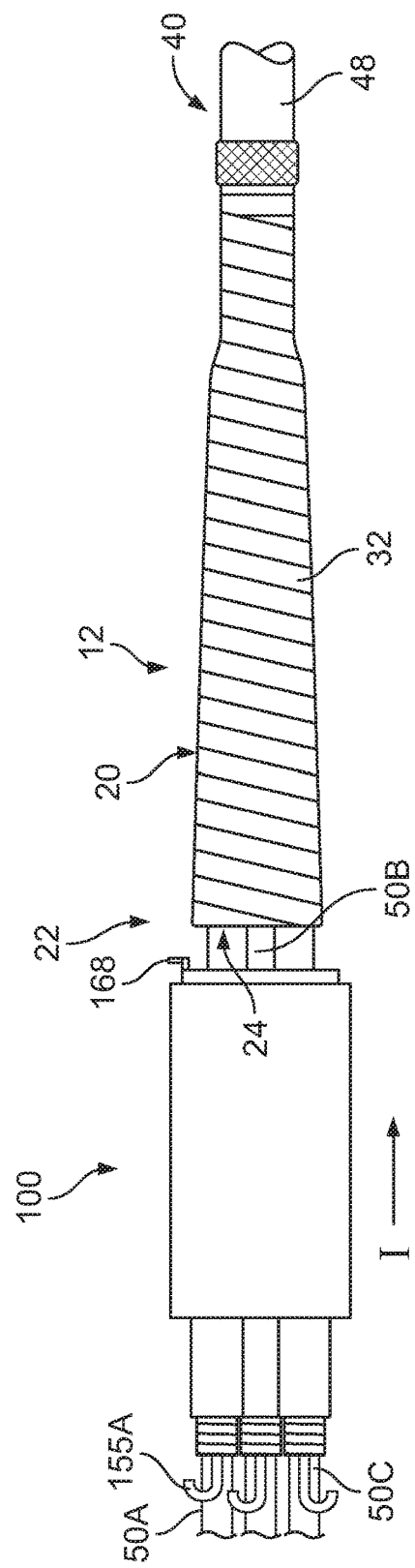

Prior to connecting the conductors 44, 54, the pre-expanded breakout boot assembly 100 is slid over the cables 50A-C such that the end opening 132 faces the PILC cable 40, as shown in FIG. 6. For the purpose of explanation, the pre-expanded breakout boot assembly 100 is not shown in the fragmentary view of FIG. 5.

Before and after installing the connectors 30, various additional components may be installed on the cable 40 and/or the cables 50A-C to enhance safety, electrical performance, durability, and/or containment of oil from the cable 40. Such components and methods of preparing the cables and splice may include those disclosed in U.S. Pat. No. 8,324,502 to Kameda et al., the disclosure of which is incorporated herein by reference.

FIG. 6 illustrates the cables 40, 50 spliced and wrapped with a metal shield mesh wrap 32. The mesh wrap 32 extends from the lead sheath 48 to an end 32A at or overlapping the jackets 58 of the cables 50A-C. The mesh wrap 32 thereby effectively forms a trunk portion 20 from which the individual cables 40, 50 extend or fan out at a cable joint 22. As shown in FIG. 6, the pre-expanded breakout boot assembly 100 is parked on the cables 50A-C adjacent the splice 12.

Figure 7:
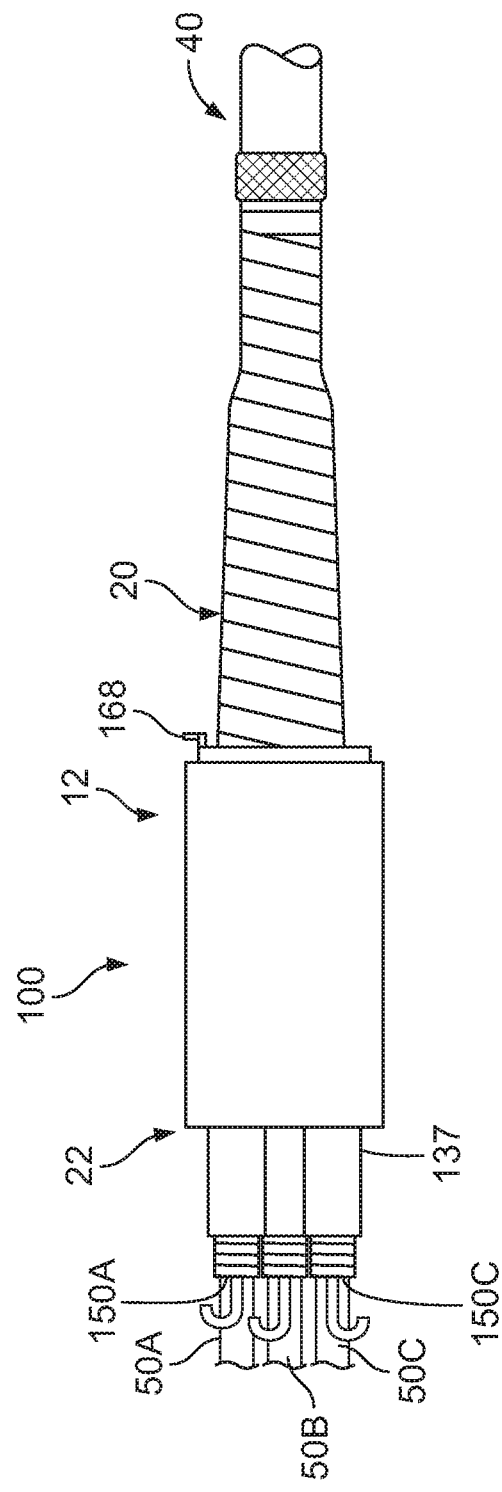

As shown in FIGS. 6 and 7, the pre-expanded unit 100 is slid over one of the cables 50A-C in the direction I toward the cable 40 until the main section 130 surrounds the trunk portion 20 (i.e., the mesh wrap 32). In some embodiments, the pre-expanded unit 100 is slid onto the mesh wrap 32 until the end wall 137 abuts or is positioned closely adjacent the crotches 24 (FIG. 6) defined between the cables 50A-C at the end opening of the mesh wrap 32.

According to some embodiments, the inside diameter of each finger holdout 150A-C is greater than the outer diameter of each cable 50A-C such that the inner diameters of the holdouts 150A-C are sufficient to slide the pre-expanded unit 100 without undue effort. Likewise, according to some embodiments, the inside diameter of the main holdout 160 is greater than the outer diameter of the mesh wrap 32 such that the inner diameter of the main holdout 160 is sufficient to receive the mesh wrap 32 without undue effort. According to some embodiments, the inner diameters of the holdouts 150A-C, 160 are at least as great as the outer diameter of the largest substrates (e.g., cable jackets 58, mesh wrap 32) that are to be received in the breakout boot assembly 102.

The rail 168 of the main holdout 160 is then removed from the pre-expanded unit 100, thereby permitting the body 166 coil up into itself and shrink (radially and circumferentially) in place under the radially compressive load of the elastically expanded main section 130. The main section 130 is thereby permitted to relax and radially retract about the cables 50A-C and the trunk portion 20 (i.e., the mesh wrap 32), as shown in FIG. 8. The relaxed inner diameter of the main section 130 is less than at least the outer diameter of the mesh wrap 32 and the collapsed body 166. Therefore, the main section 130 exerts a radially inwardly compressive or clamping force or pressure (due to elastic tension) onto the cables 50 and the mesh wrap 32. It will be appreciated that in this embodiment, the body 166 will remain in the protected cable joint 15.

Each finger holdout 150A-C is then removed from the pre-expanded unit 100, thereby permitting each finger 120A-C to relax and radially retract about the cable 50 therein, as shown in FIGS. 8 and 9. The relaxed inner diameter of each finger 120A-C is less than at least the outer diameter of the cable jacket 58. Therefore, the finger 120A-C exerts a radially inwardly compressive or clamping force or pressure (due to elastic tension) about and onto the cable jacket 58. The finger 120A-C may thereby effect a liquid tight seal at the interfaces between the fingers 120A-C and the cable jackets 58. These seals can protect the cable and the splice from the ingress of environmental moisture.

Each mastic layer 140A-C preferentially adheres to the inner surface 126 of its finger 120A-C and separates or releases from the finger holdout strip 155. Upon removal of the corresponding finger holdout 150A-C, the mastic layer 140A-C is thus captured, interposed or sandwiched between the finger 120A-C and the cable jacket 58 and directly engages the interface surfaces of the cable 50A-C and the finger 120A-C as shown in FIG. 9. The finger 120A-C is not fully recovered to its relaxed state, and therefore continues to apply a persistent radially compressive load or pressure to the mastic layer 140A-C.

The relaxed inner diameter of each finger 120A-C is less than at least the outer diameter of the jacket layer 58 it surrounds. Therefore, the finger 120A-C exerts a radially inwardly compressive or clamping force or pressure (due to elastic tension) about and onto the cable 50A-C. The finger 120A-C may thereby effect a liquid tight seal at the cable and finger interfaces. These seals can protect the cable and the splice from the ingress of environmental moisture.

The cover assembly 100 is thereby fully installed to form the protected cable breakout joint 15 as shown in FIGS. 8 and 9. The breakout boot assembly 102 and the splice connection 12 are relatively arranged and configured such that each mastic layer 140A-C forms an axially and circumferentially continuous tube surrounding its cable 50 through a length LMM (FIG. 8) within the finger 120A-C. Each mastic layer 140A-C is thus interposed between and engages the interface surfaces of the cable 50A-C and the finger 120A-C.

According to some embodiments, each mastic layer 140A-C has a length LMM (when installed; FIG. 8) in the range of from about 1 to 1.5 inches.

According to some embodiments, each mastic layer 140A-C, when installed, has a thickness TMM (FIG. 9) in the range of from about 3 to 6 mm.

The pre-expanded unit 101 can provide significant advantages during installation and in service.

According to some embodiments, the mastic layers 140A-C can flow at temperatures in the intended service range, including at room temperature. In some embodiments, the mastic layers 140A-C can flow (i.e., are flowable), but are not free flowing, at least at temperatures in an operating temperature range of from about −20° C. to 135° C. According to some embodiments, the mastic layers 140A-C have a free flowing temperature that is higher than 150° C. As such, the cover assembly 100 can be effectively and reliably cold-applied to the splice.

The mastic layers 140A-C applied and retained under the elastic pressure of the partially radially expanded breakout boot 110 will flow and conform to the irregularities of the exposed surfaces of the cables 50A-C and the inner surfaces 126 of the breakout boot fingers 120A-C.

The mastic layers 140A-C can be factory-applied to the breakout boot 110 (to form the breakout boot assembly 102) and factory-mounted on the holdouts 150A-C, 160 (to form the pre-expanded unit 100 or a part thereof. As such, the risks that an installer may forget to apply the mastics or that the mastics may be contaminated are eliminated.

The factory-applied mastic also eliminates or reduces the risk that the finger mastics will be misapplied (e.g., in the wrong locations or with insufficient or irregular or incomplete coverage). The factory-applied mastic may also eliminate the need for separate application of mastics and void filling greases during the product installation process as may be required for known products and installation methods.

According to some embodiments (e.g., when formed from a silicone-based mastic as described hereinabove), the mastic layers 140A-C are formulated to be stable under the elastic compression force of the breakout boot 110 while expanded on the holdouts 150A-C. According to some embodiments, the mastic layers 140A-C are resistant to oil bleed out under pressure and do not migrate in between the interstices of the holdouts 150A-C.

With reference to FIGS. 10-13, a pre-expanded breakout boot assembly unit 200 (also referred to herein as "the pre-expanded unit 200") according to further embodiments of the present invention is shown therein. The pre-expanded unit 200 is constructed in and can be used in the same manner as the pre-expanded unit 100, except as discussed below. The pre-expanded unit 200 includes a includes a breakout cover or boot 210, three finger sealant layers of a flowable, conformable material or medium (hereinafter, "conformable medium" or "mastic") 240A-C, three finger holdouts 250A-C corresponding to the components 110, 140A-C, and 150A-C, respectively. The pre-expanded unit 200 further includes a main or trunk section sealant layer 270 of a flowable, conformable sealant material or medium and a main or trunk holdout 260. The breakout boot 210, the layers 240A-C, and the main sealant layer 270 form a breakout boot assembly 201.

The main holdout 260 is placed and generally functions in the same manner as the holdout 160. However, the main holdout 260 is a spirally wound holdout of the same construction as described above the finger holdouts 150A-C. The main holdout 260 includes a helically wound strip 265 having a pull section 265A.

The main or trunk sealant layer 270 of a flowable, conformable sealant material or medium may be a layer of mastic as described above for the layers 140A-C. The medium or mastic of the layer 270 may be the same or different in composition, properties and/or dimensions as the layers 240A-C.

The breakout boot assembly 201 may be installed from the pre-expanded unit 200 in the same manner as described above for the pre-expanded unit 100. However, in the case of the pre-expanded unit 200, the body of the holdout 260 is removed from the breakout boot 210 and, when installed, the trunk mastic layer 270 is interposed between the main section 230 and the underlying substrate (e.g., the mesh wrap 32). The trunk mastic layer 270 will engage the inner surface of main section 230 and the outer surface of the substrate.

With reference to FIG. 12, an exemplary cable 61 for use with the pre-expanded unit 200 is shown therein. The cable 61 includes a bundle of three cores 60 surrounded by a tubular, electrically insulating cable jacket 69. Each core 60 includes a conductor 64 surrounded by a respective insulation layer 66 and jacket 68. The cores 60 may each be a polymer insulated cable or an insulated wire, for example. According to some embodiments, the cable 61 is prepared as show in FIG. 12 such that sections of the cores 60 extend axially outwardly beyond an open end 68A of the jacket 68 at a joint 22'. The pre-expanded unit 200 mounted on the cable 61 such that the cores 60 extend through the finger holdouts 250A-C. The pre-expanded unit 200 is then slid over the jacket 68 adjacent the joint 22'. The holdouts 250A-C are removed from the fingers 220A-C and the main section 230. The breakout boot assembly 201 is thereby installed on the cable 61 with the finger mastic layers 250A-C interposed between and contacting each of the inner surface of the associated finger 220A-C and the outer surface of the core insulation or jacket 68. The holdout 260 is removed from the main section 230. The breakout boot assembly 201 is thereby installed on the cable jacket 69 with the main section mastic layer 270 interposed between and contacting the inner surface of the main section 230 and the outer surface of the cable jacket 69.

In other embodiments, the cable 61 may be a PILC cable, in which case the component 69 would be a metal sheath and the cores 60 would be paper insulated conductors.

Pre-expanded breakout boot assemblies according to embodiments of the present invention and as described herein can be used to cover and seal any suitable cable joint. The trunk portion may be, but is not limited to, a jacketed bundle of cables from which individual cables or cores extend or fan out (e.g., as shown in FIG. 12), one or more splices from which individual cables or cores extend or fan out (e.g., as shown in FIG. 5), or a bundle of cables that are re-jacketed or otherwise covered with individual cables or cores extending or fanned out from the re-jacket or other cover. The outermost layer of the trunk portion may be, for example, an original cable jacket, a re-jacket or other cover, a metal shield layer (e.g., a metal mesh wrap), a metal sheath (e.g., a lead sheath of a PILC cable), an oil barrier tube, or any other suitable component.

For each type or construction of trunk portion, the pre-expanded breakout boot assembly may include a collapsible main holdout that remains in the joint when the breakout boot assembly is installed (e.g., as in FIG. 8), a removable main holdout that is removed to permit a trunk mastic to remain in the installed breakout boot assembly (e.g., as in FIG. 13), or a removable main holdout that is removed without provision of a trunk mastic.

While the finger sealants 140A-C, 240A-C are shown and described herein installed such that they engage the outer surfaces of the cable jackets 58, 68, in other embodiments the installed finger sealants may engage (i.e., contact) a different layer of the cable 50A-C, 60 or a layer surrounding the cable 50A-C, 60 (e.g., an oil barrier tube or re-jacketing sleeve). Similarly, the main section sealant layer 270 may engage a different layer of the trunk or a layer surrounding the trunk (e.g., superimposed over the jacket 69; e.g., an oil barrier tube or re-jacketing sleeve).

Advantageously, pre-expanded breakout boot assembly units as disclosed herein can make installation of a breakout boot with sealant layers easier and less time-consuming. The inventive pre-expanded breakout boot assembly units can reduce the finger strength and dexterity required of the installer.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

That which is claimed is:

1. A pre-expanded breakout boot assembly for protecting a cable joint, the cable joint including a trunk and a plurality of cables extending from the trunk, the pre-expanded breakout boot assembly comprising:
   a breakout boot assembly including:
      a cold-shrinkable, electrically insulative, elastomeric breakout boot including:
         a tubular main section having an interior surface defining a main passage; and
         a plurality of tubular fingers extending from an end of the main section, each of the fingers having an interior surface defining a finger interior passage; and
      a plurality of tubular finger sealant layers of a conformable medium, wherein each of the finger sealant layers is pre-mounted on the interior surface of a respective one of the fingers, wherein the conformable medium is a flowable material; and
   a plurality of removable finger holdouts, wherein each of the finger holdouts is mounted in the finger passage of a respective one of the fingers such that the finger holdout maintains the finger in an elastically radially expanded state, and the finger holdout is selectively removable from the finger to permit the finger to elastically radially contract;
   wherein each finger sealant layer is positioned and configured such that, when the pre-expanded breakout boot assembly is positioned on the cable joint with a cable extending through each finger passage, the finger holdouts are removed from the breakout boot assembly, and each finger elastically radially contracts about a respective one of the cables, each finger sealant layer will be radially interposed between each of the interior surface of the finger and the cable extending through the finger.

2. The pre-expanded breakout boot assembly of claim 1 wherein each finger sealant layer engages each of the interior surface of the associated finger and an opposing surface of the cable extending through the finger.

3. The pre-expanded breakout boot assembly of claim 1 wherein each finger holdout includes a tubular holdout formed by a helically wound strip, and the finger holdout is configured to be removed from the finger by pulling the strip.

4. The pre-expanded breakout boot assembly of claim 1 further including:
   a tubular main sealant layer of a conformable medium, wherein the main sealant layer is pre-mounted on the interior surface of the main section, wherein the conformable medium is a flowable material; and
   a removable main holdout, wherein the main holdout is mounted in the main passage such that the main holdout maintains the main section in an elastically radially expanded state, and the main holdout is selectively removable from the main section to permit the main section to elastically radially contract;
   wherein the main sealant layer is positioned and configured such that, when the pre-expanded breakout boot assembly is positioned on the cable joint with the trunk extending through the main passage, the main holdout is removed from the breakout boot assembly, and the main section elastically radially contracts about the trunk, the main sealant layer will be radially interposed between each of the interior surface of the main section and the trunk extending through the main section.

5. The pre-expanded breakout boot assembly of claim 4 wherein the main holdout includes a tubular holdout formed by a helically wound strip, and the main holdout is configured to be removed from the main section by pulling the strip.

6. The pre-expanded breakout boot assembly of claim 1 wherein the pre-expanded breakout boot assembly further includes a main holdout, wherein the main holdout is mounted in the main passage such that the main holdout maintains the main section in an elastically radially expanded state, and the main holdout is selectively collapsible to permit the main section to elastically radially contract.

7. The pre-expanded breakout boot assembly of claim 1 wherein the breakout boot is formed of ethylene propylene diene monomer (EPDM) rubber.

8. The pre-expanded breakout boot assembly of claim 1 wherein the conformable medium is a mastic.

9. The pre-expanded breakout boot assembly of claim 8 wherein the mastic is a butyl rubber-based mastic or a silicone rubber-based mastic.

10. A method of manufacturing a pre-expanded breakout boot assembly for protecting a cable joint, the cable joint including a trunk and a plurality of cables extending from the trunk, the method comprising:
   providing:
      a cold-shrinkable, electrically insulative, elastomeric breakout boot including:
         a tubular main section having an interior surface defining a main passage; and
         a plurality of tubular fingers extending from an end of the main section, each of the fingers having an interior surface defining a finger interior passage; and
      a plurality of removable finger holdouts;
   mounting each of a plurality of tubular finger sealant layers of a conformable medium on a respective one of the plurality of removable finger holdouts, wherein the conformable medium is a flowable material; and thereafter
   mounting each of the finger holdouts in the finger passage of a respective one of the fingers such that the finger holdout maintains the finger in an elastically radially expanded state, and the finger holdout is selectively removable from the finger to permit the finger to elastically radially contract;
   wherein each finger sealant layer is positioned and configured such that, when the pre-expanded breakout boot assembly is positioned on the cable joint with a cable extending through each finger passage, the finger holdouts are removed from the breakout boot assembly, and each finger elastically radially contracts about a respective one of the cables, each finger sealant layer will be radially interposed between each of the interior surface of the finger and the cable extending through the finger.

* * * * *